United States Patent
Heeter et al.

(10) Patent No.: US 10,612,564 B2
(45) Date of Patent: Apr. 7, 2020

(54) ACOUSTIC PANEL OF TURBINE ENGINE AND METHOD OF ARRANGING THE ACOUSTIC PANEL

(71) Applicant: Rolls-Royce Corporation, Indianapolis, IN (US)

(72) Inventors: Robert W. Heeter, Noblesville, IN (US); Jonathan Rivers, Indianapolis, IN (US); Dennes Kyle Burney, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 275 days.

(21) Appl. No.: 15/452,311

(22) Filed: Mar. 7, 2017

(65) Prior Publication Data

US 2018/0258954 A1    Sep. 13, 2018

(51) Int. Cl.
| | |
|---|---|
| F04D 29/66 | (2006.01) |
| F02C 7/04 | (2006.01) |
| F02C 7/20 | (2006.01) |
| F02C 7/045 | (2006.01) |
| F02K 3/06 | (2006.01) |

(Continued)

(52) U.S. Cl.
CPC ............ F04D 29/663 (2013.01); F02C 7/045 (2013.01); F02C 7/20 (2013.01); F02K 3/06 (2013.01); F04D 29/526 (2013.01); F04D 29/644 (2013.01); F05D 2220/323 (2013.01); F05D 2220/36 (2013.01); F05D 2230/60 (2013.01); F05D 2230/70 (2013.01)

(58) Field of Classification Search
CPC .... F04D 29/663; F04D 29/526; F04D 29/644; F02C 7/045; F02C 7/20; F02K 3/06; F05D 2220/323; F05D 2220/36; F05D 2230/60

USPC .......................................... 60/226.1; 415/119
See application file for complete search history.

(56) References Cited

U.S. PATENT DOCUMENTS

| | | | |
|---|---|---|---|
| 6,761,245 B2 * | 7/2004 | Porte ................. | F02C 7/045 |
| | | | 181/210 |
| 6,920,958 B2 | 7/2005 | Harrison | |

(Continued)

FOREIGN PATENT DOCUMENTS

| | | |
|---|---|---|
| EP | 1 020 845 A2 | 7/2000 |
| EP | 1 880 941 A2 | 1/2008 |
| EP | 2 105 597 A2 | 9/2009 |

OTHER PUBLICATIONS

European Search Report for European Application No. EP 18155678, dated Jun. 25, 2018 (8 pages).

*Primary Examiner* — Syed O Hasan
(74) *Attorney, Agent, or Firm* — McCracken & Gillen LLC

(57) ABSTRACT

An aircraft engine includes a rotating structure and a casing circumferentially surrounding the rotating structure. The aircraft engine further includes an acoustic panel for noise reduction circumferentially surrounding the rotating structure and disposed adjacent the casing. The acoustic panel comprises a plurality of acoustic panel members arranged adjacent to one another to form a substantially complete ring of the acoustic panel. A first acoustic panel member of the plurality of acoustic members is adjacent to a second acoustic panel member of the plurality of acoustic members. The first acoustic panel member is removably secured to the second acoustic panel member by a releasable fastening assembly.

15 Claims, 14 Drawing Sheets

(51) Int. Cl.
*F04D 29/52* (2006.01)
*F04D 29/64* (2006.01)

(56) References Cited

U.S. PATENT DOCUMENTS

| | | | |
|---|---|---|---|
| 7,866,440 B2 * | 1/2011 | Douglas | B64D 33/02 |
| | | | 181/210 |
| 7,866,939 B2 | 1/2011 | Harper et al. | |
| 7,967,108 B2 | 6/2011 | Harper | |
| 8,579,078 B2 * | 11/2013 | Hurlin | B64D 33/02 |
| | | | 181/213 |
| 2004/0045765 A1 | 3/2004 | Porte | |
| 2004/0094359 A1 * | 5/2004 | Porte | B64D 33/02 |
| | | | 181/214 |
| 2008/0069688 A1 | 3/2008 | Harper et al. | |

* cited by examiner

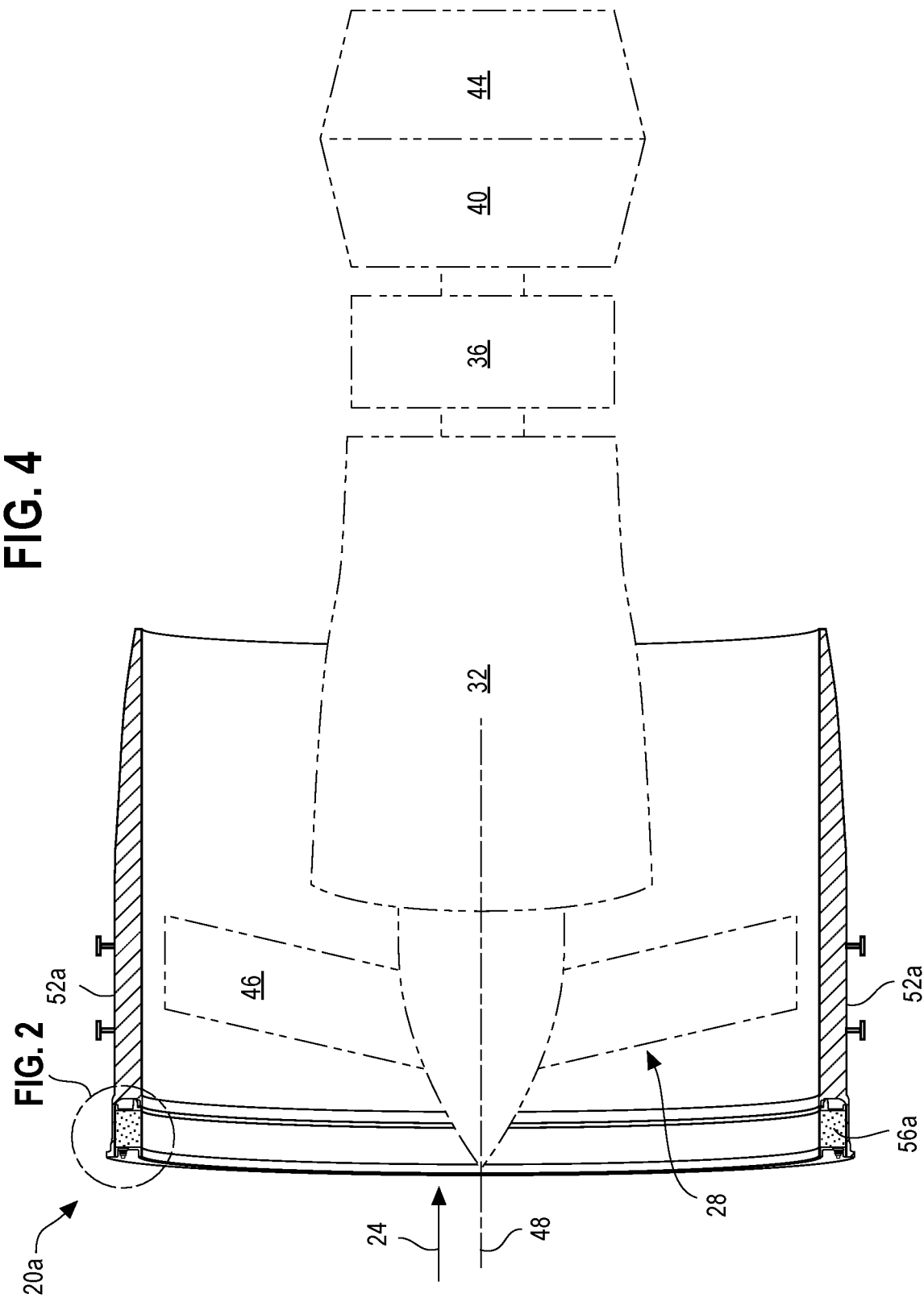

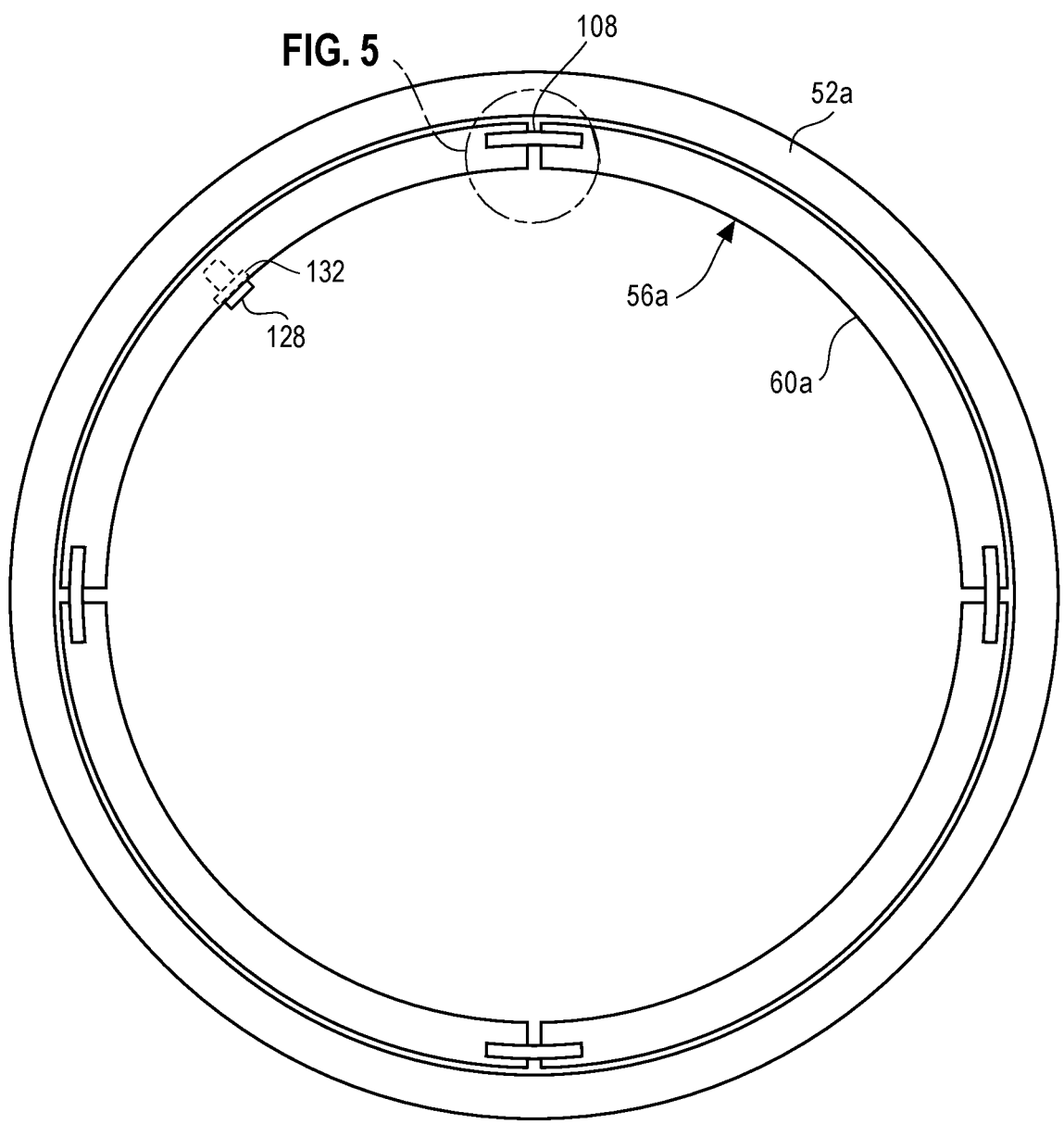

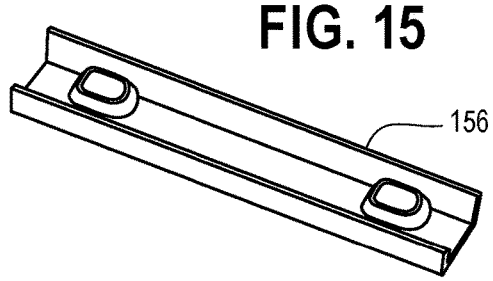
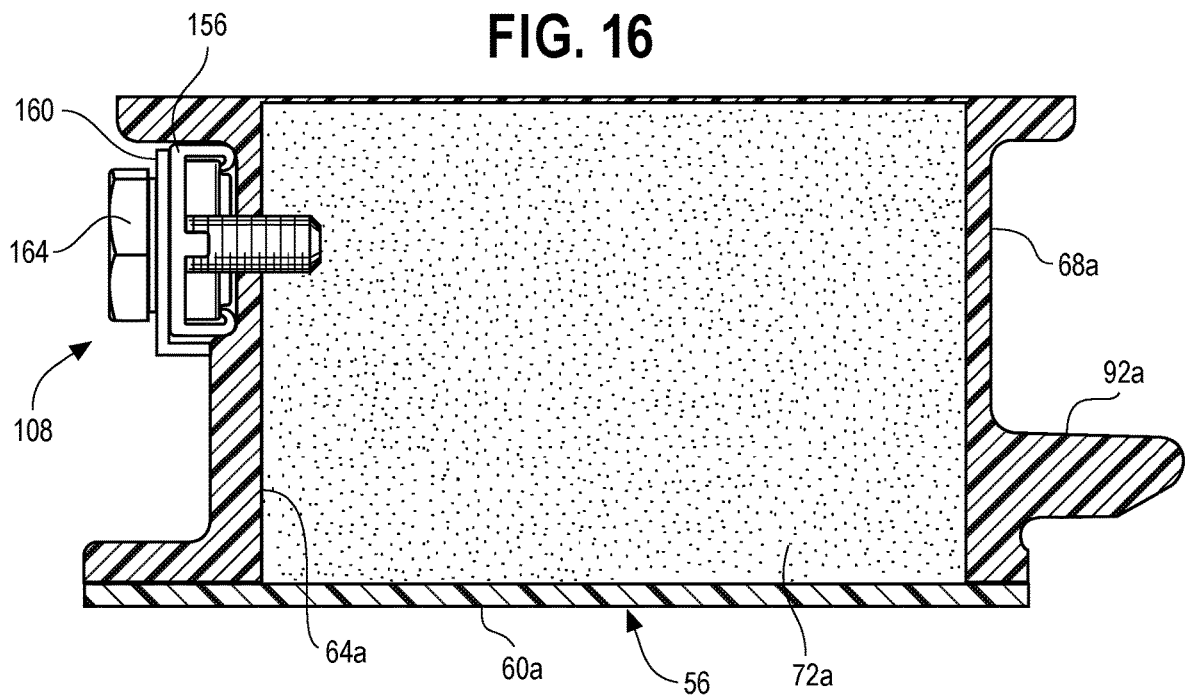
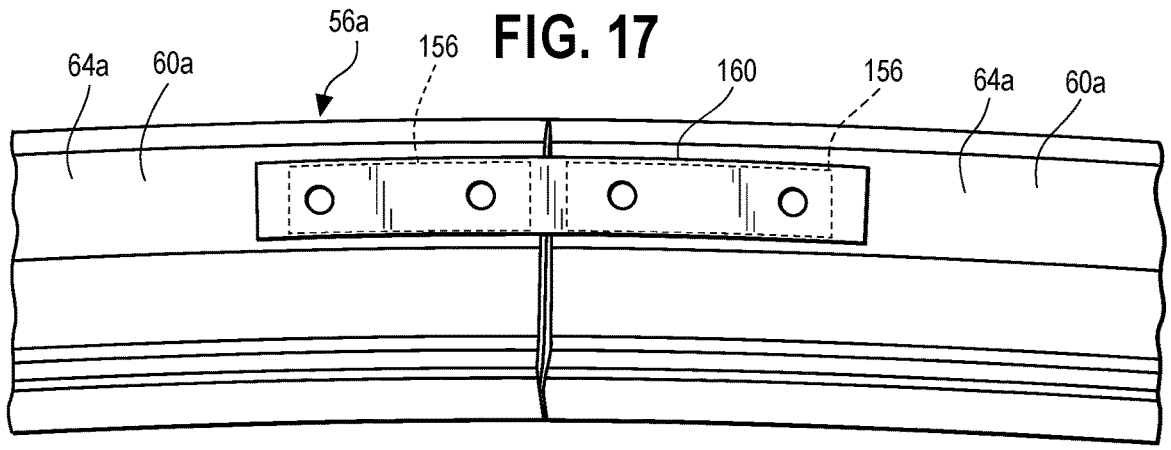

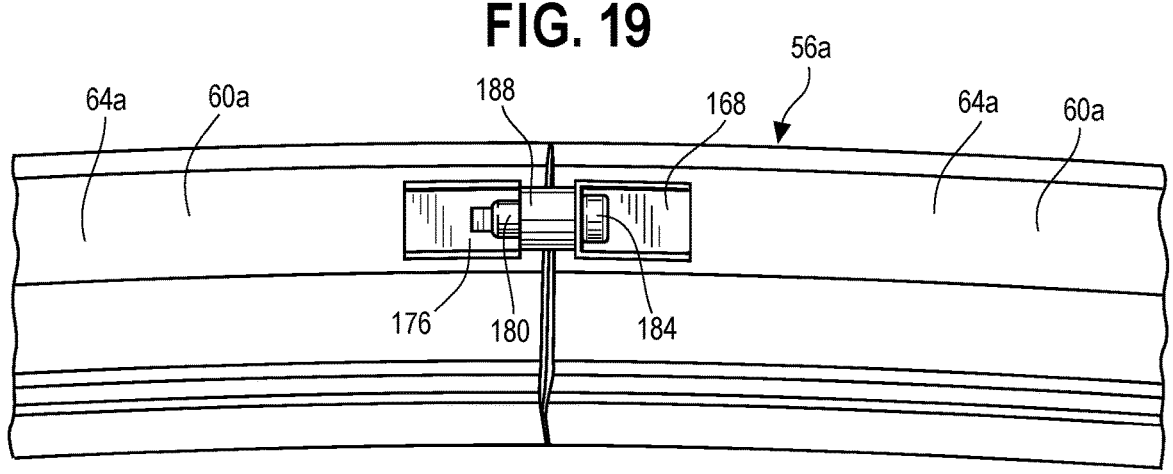
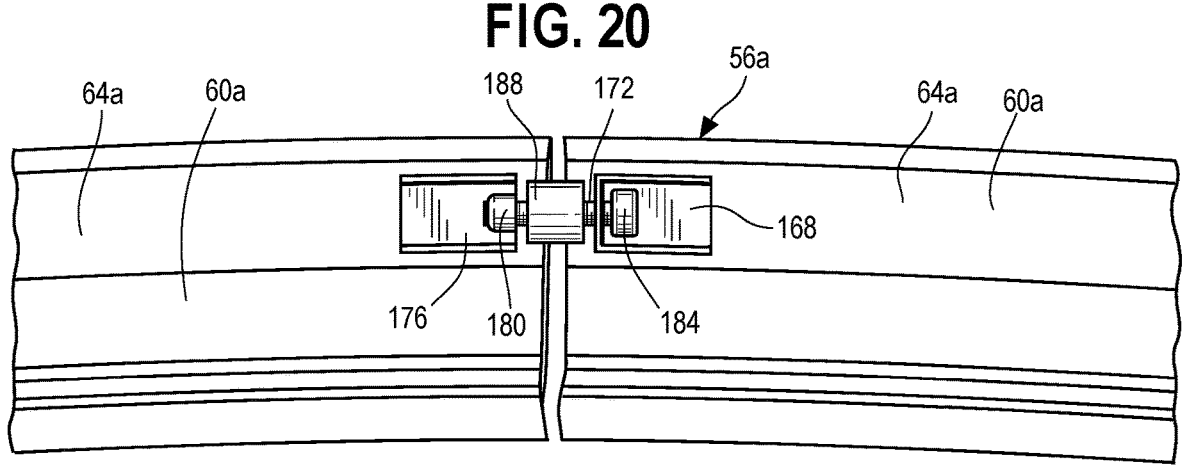

ACOUSTIC PANEL OF TURBINE ENGINE AND METHOD OF ARRANGING THE ACOUSTIC PANEL

FIELD OF DISCLOSURE

The present subject matter relates to turbomachines and acoustic panels for noise reduction.

BACKGROUND

An aircraft engine or other turbomachine may produce noise during operation and this may be an inconvenience for pilots or passengers of an aircraft. Also, the noise may be an inconvenience for residential neighborhoods located near airports. To minimize this inconvenience, turbine engines may include an acoustic panel for noise mitigation. In certain contexts, improving the securement of the acoustic panel to the rest of the aircraft engine may be desirable. Additionally, improving ease of installation and ease of repair of the acoustic panel may also be desirable.

SUMMARY

According to one aspect, an aircraft engine includes a rotating structure and a casing circumferentially surrounding the rotating structure. The aircraft engine further includes an acoustic panel for noise reduction circumferentially surrounding the rotating structure and disposed adjacent the casing. The acoustic panel comprises a plurality of acoustic panel members arranged adjacent to one another to form a substantially complete ring of the acoustic panel. A first acoustic panel member of the plurality of acoustic members is adjacent to a second acoustic panel member of the plurality of acoustic members. The first acoustic panel member is removably secured to the second acoustic panel member by a releasable fastening assembly.

According to another aspect, a method of arranging an acoustic panel of a gas turbine engine includes releasing a fastening assembly that secures a first acoustic panel member to a second acoustic panel member. The method further includes removing the first acoustic panel member from the gas turbine engine. The method further includes installing a replacement acoustic panel member to the gas turbine engine. The replacement acoustic panel is one of the first acoustic panel member and a third acoustic panel member. The method further includes securing the fastening assembly in a manner that secures the replacement acoustic panel member to the second acoustic panel member.

According to yet another aspect, an acoustic panel of an aircraft engine includes a plurality of acoustic panel members arranged adjacent to one another to form a substantially complete annulus of the acoustic panel. A first acoustic panel member of the plurality of acoustic panel members is adjacent to a second acoustic panel member of the plurality of acoustic panel members. Furthermore, the first acoustic panel member is removably attached to the second acoustic panel member by a releasable fastening assembly.

Other aspects and advantages will become apparent upon consideration of the following detailed description and the attached drawings wherein like numerals designate like structures throughout the specification.

BRIEF DESCRIPTION OF THE DRAWINGS

FIG. 4 is a schematic cross-sectional view of a fan casing and an acoustic panel of a gas turbine engine, with the remainder of the gas turbine engine shown in environment;

FIG. 4A is a schematic front elevational view of the acoustic panel and the fan casing, showing one member of the acoustic panel secured to another member of the acoustic panel by the releasable fastening assembly;

FIG. 15 is an isometric view of a nutplate that can be used in a third embodiment of a releasable fastening assembly;

FIG. 16 is a cross-sectional view of the acoustic panel, showing the third embodiment of a releasable fastening assembly;

FIG. 17 is a front elevational view of a part of the acoustic panel along with two nutplates and an L-shaped strap of the third embodiment of the releasable fastening assembly;

FIG. 19 is a front elevational view of a part of the acoustic panel with a fourth embodiment of the releasable fastening assembly in a tightly fastened state; and FIG. 20 is a front elevational view of a part of the acoustic panel with the fourth embodiment of the releasable fastening assembly in a loosely fastened state.

DETAILED DESCRIPTION

Figure 1:
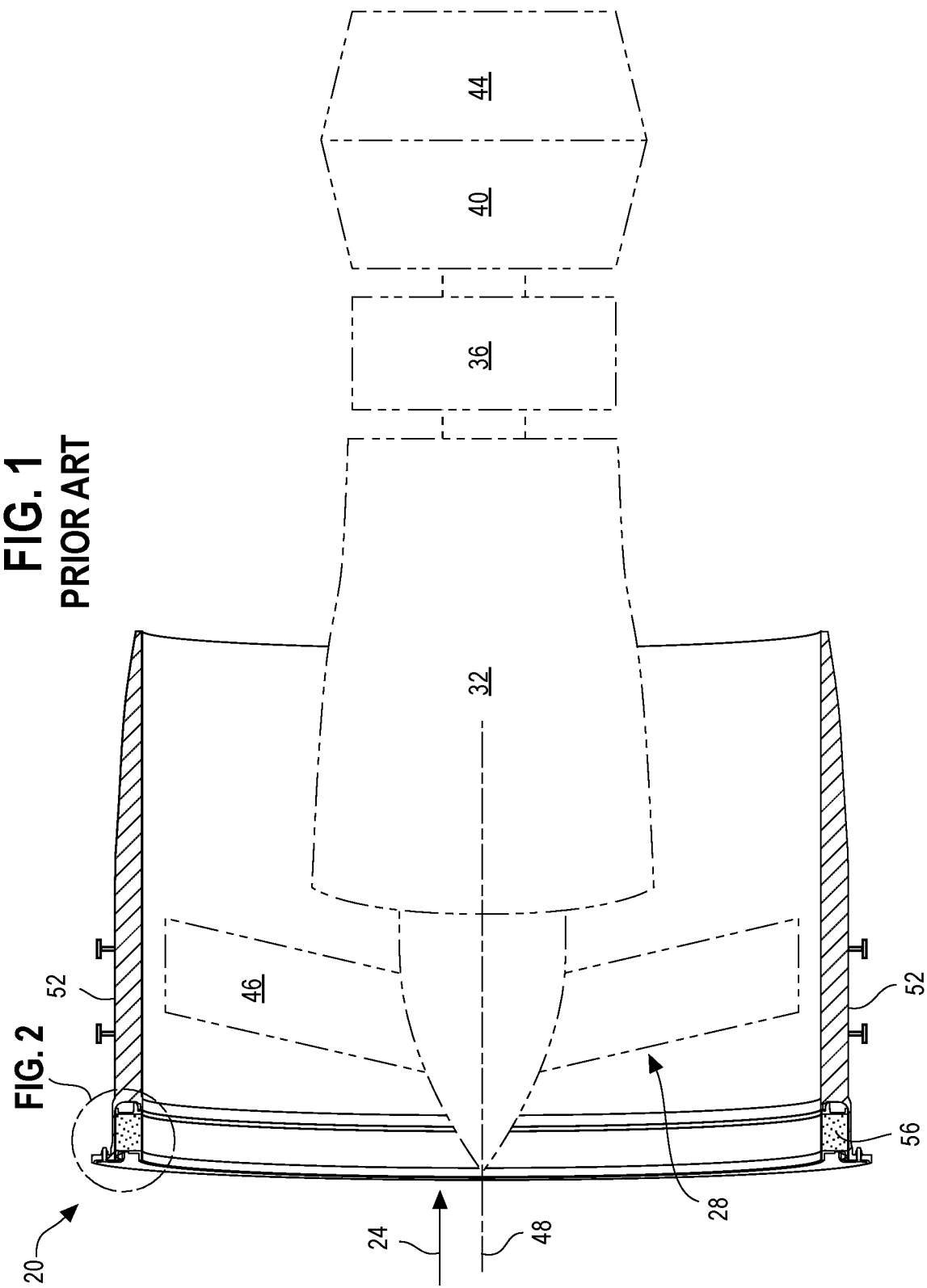
FIG. 1 is a schematic cross-sectional view of a fan casing and a prior art acoustic panel of a gas turbine engine, with the remainder of the gas turbine engine shown in environment.

Referring now to FIG. 1, an exemplary aircraft engine in the form of a gas turbine engine 20 includes an intake 24, a fan 28, a compressor 32, a combustion chamber 36 that receives compressed air from the compressor 32, a turbine 40 that converts rapidly expanding fuel and air into rotary motive power, and an exhaust 44. The fan 28 includes a plurality of fan blades 46 and rotates about a central longitudinal axis 48 of the turbine engine 20. As further shown in FIG. 1, the turbine engine 20 includes a fan casing 52 that circumferentially surrounds the fan 28. The fan 28 is an example of a rotating structure.

Figure 2:
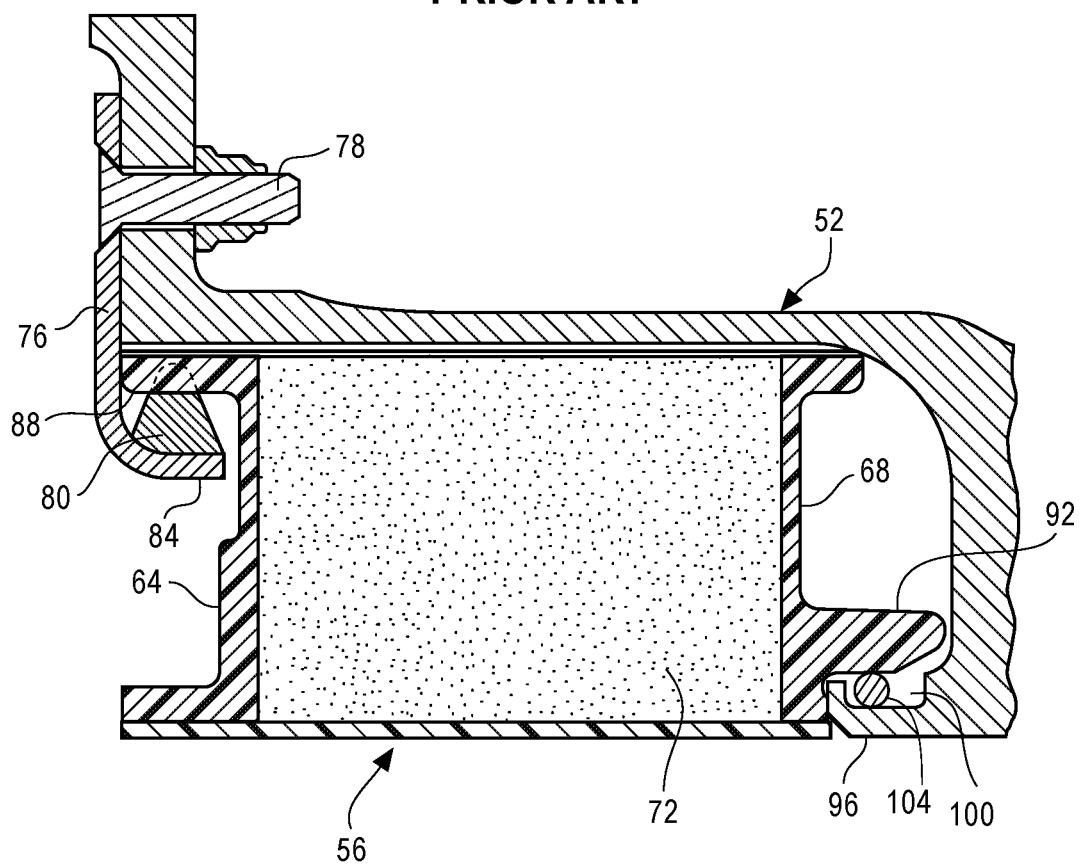
FIG. 2 is an enlarged cross-sectional view of the portion of FIG. 1 indicated by line 2 of FIG. 1.
Figure 3:
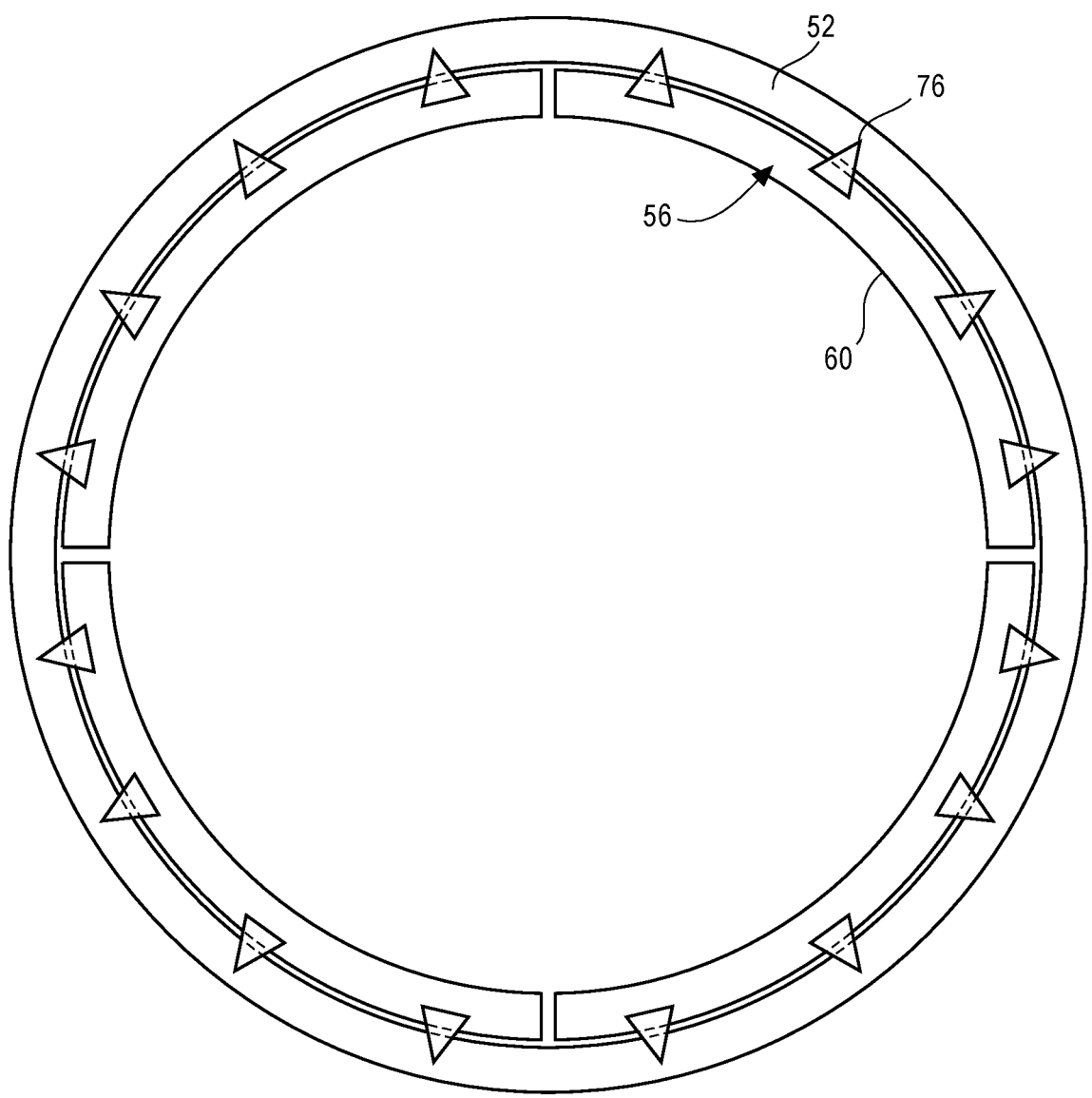
FIG. 3 is a schematic front elevational view of an acoustic panel and a fan casing of the gas turbine engine, as known in the art.

As further shown in FIG. 1, the turbine engine 20 further comprises a front acoustic panel 56 that is disposed adjacent the fan casing 52 and forward of the fan blades 46. It should be noted that the front acoustic panel 56, as depicted in FIGS. 1-3, is already known in the art. As shown in FIG. 3, the front acoustic panel 56 includes four acoustic panel members 60 that together form a substantially complete ring (or annulus) that is enclosed by the fan casing 52. Each acoustic panel member 60 interfaces with the fan casing 52 as shown in FIG. 2.

As further shown in FIG. 2, each acoustic panel member 60 includes a forward rail 64, an aft rail 68, and honeycomb acoustic material 72 disposed therebetween. The forward rail 64 interfaces with a bracket 76 that is secured to the fan casing 52 by a horizontal fastener 78, as further shown in FIG. 2. The bracket 76 includes cones 80 extending upward from a bottom lip 84 of the bracket 76. The cones 80 are nestled in an upper lip 88 of the forward rail 64. Moreover, the bottom lip 84 of the bracket 76 is positioned below the upper lip 88 such that it interferes with downward movement of the forward rail 64. As further shown in FIG. 3, each acoustic panel member 60 interfaces with four brackets 76 in this manner. The four brackets 76 of each acoustic panel member 60 are secured to the fan casing 52, for a total of sixteen brackets 76, as shown in FIG. 3.

As further shown in FIG. 2, the aft rail 68 includes an aft protrusion 92 that protrudes in the aft direction and is disposed above a forward protrusion 96 of the fan casing 52. The forward protrusion 96 includes a recess 100 in which an O-ring 104 is positioned. The O-ring 104 is disposed between the forward protrusion 96 of the fan casing 52 and the aft protrusion 92 of the aft rail 68.

In certain situations, it is advantageous to improve the securement of the front acoustic panel 56 to the fan casing 52. Such improved securement may be provided using a full hoop front acoustic panel 56 but one disadvantage with a full hoop front acoustic panel 56 is that it may be inconvenient to install, repair, or replace in certain contexts. Therefore, there exists a need for an acoustic panel 56 that has improved securement to the fan casing 52 and is convenient to install, repair or replace.

Referring now to FIG. 4, an exemplary aircraft engine in the form of a gas turbine engine 20a includes an intake 24, a fan 28, a compressor 32, a combustion chamber 36 that receives compressed air from the compressor 32, a turbine 40 that converts rapidly expanding fuel and air into rotary motive power, and an exhaust 44. The fan 28 includes a plurality of fan blades 46 and rotates about a central longitudinal axis 48 of the turbine engine 20a. The fan 28 may be disposed near a forward end of the engine 20a, as further shown in FIG. 4. As further shown in FIG. 4, the turbine engine 20a includes a fan casing 52a that circumferentially surrounds the fan 28. The fan 28 is an example of a rotating structure and the fan casing 52a is an example of a stationary structure of the aircraft engine 20a.

Figure 8:
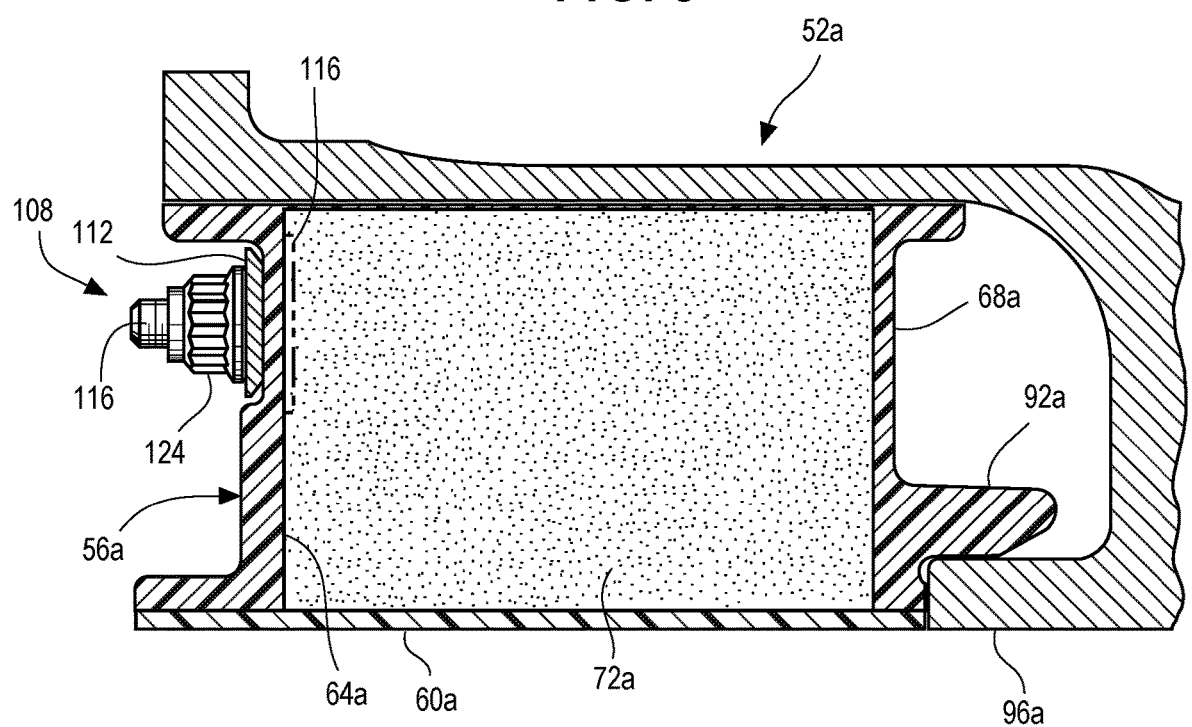
FIG. 8 is a cross-sectional view of the acoustic panel taken along lines 8-8 of FIG. 5, showing the fan casing around the acoustic panel.

A front acoustic panel 56a shown in FIG. 4A has four (or some other plurality of) acoustic panel members 60a that are arranged adjacent to one another to form a substantially complete ring ("ring" hereinafter) of the front acoustic panel 56a. The front acoustic panel 56a is for noise reduction and circumferentially surrounds a rotating structure such as the fan 28. The front acoustic panel 56a is disposed adjacent a fan casing 52a, as shown in FIG. 8, for example. More particularly, the front acoustic panel 56a is disposed radially inside the fan casing 52a, as shown in FIG. 8. As further shown in FIG. 4A, each acoustic panel member 60a is removably secured to an adjacent acoustic panel member 60a by a releasable fastening assembly 108, for a total of four releasable fastening assemblies 108 securing the four acoustic panel members 60a. Securing the acoustic panel members 60a in this manner provides improved radial securement of the front acoustic panel 56a. In other words, no one acoustic panel member 60a can fall toward the center because each is secured to another acoustic panel member 60a to form a ring of the front acoustic panel 56a. Moreover, the front acoustic panel 56a does not need to interface with sixteen brackets 76 for radial securement. The elimination of the sixteen brackets 76 and their associated horizontal fasteners 78 provides cost savings during manufacture and provides ease of installation and repair/replacement.

The front acoustic panel 56a having the releasable fastening assemblies 108 also has advantages over an actual full hoop front acoustic panel because a full hoop front acoustic panel can be difficult to manufacture, install, repair and replace. For example, if one part of a full hoop front acoustic panel is damaged during flight, the entire full hoop front acoustic panel may have to be removed from the aircraft engine to repair the one part that is damaged. Such a task may necessitate more than an overnight maintenance session, which risks a delay or cancellation of the flight that was scheduled for the following day. The front acoustic panel 56a having the releasable fastening assemblies 108 reduces the likelihood of such inconveniences because one acoustic panel member 60a can be removed, repaired, and replaced without uninstalling other non-damaged acoustic panel members 60a due to the releasable nature of the releasable fastening assemblies 108, which is further described below.

The releasable fastening assembly 108 can be any type of assembly that can secure one acoustic panel member 60a to a neighboring acoustic panel member 60a in a releasable or unlockable manner. It should be noted that the releasable fastening assemblies 108 described below can be modified as needed. For example, instead of using four fasteners as a part of a releasable fastening assembly 108, perhaps only two fasteners can be used in a situation where one fastener for each acoustic panel member 60a is sufficient.

Figure 5:
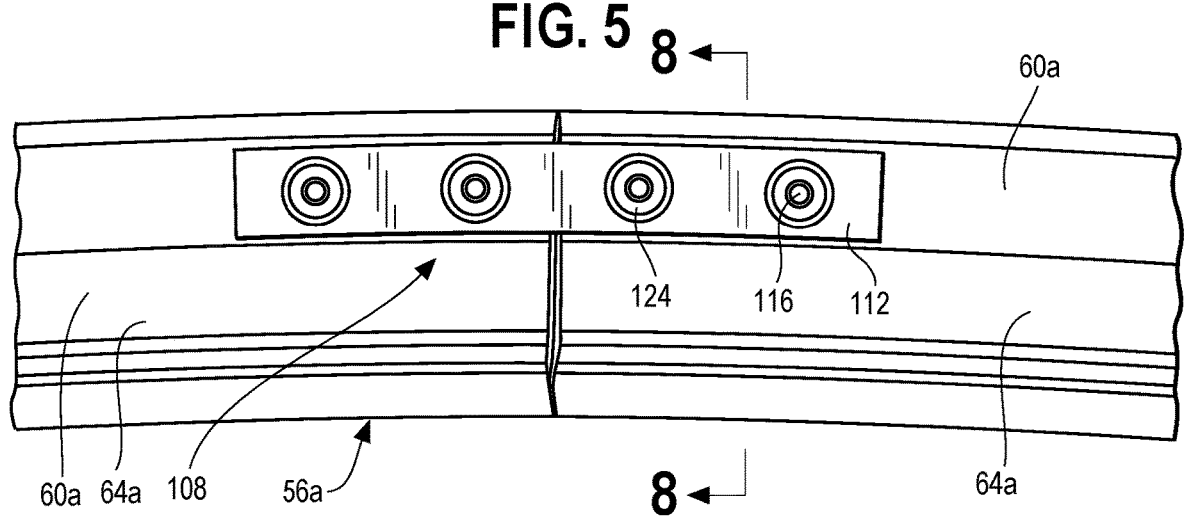
FIG. 5 is an enlarged front elevational view of the portion of FIG. 4A indicated by line 5 of FIG. 4A, showing a part of the acoustic panel with the releasable fastening assembly.
Figure 6:
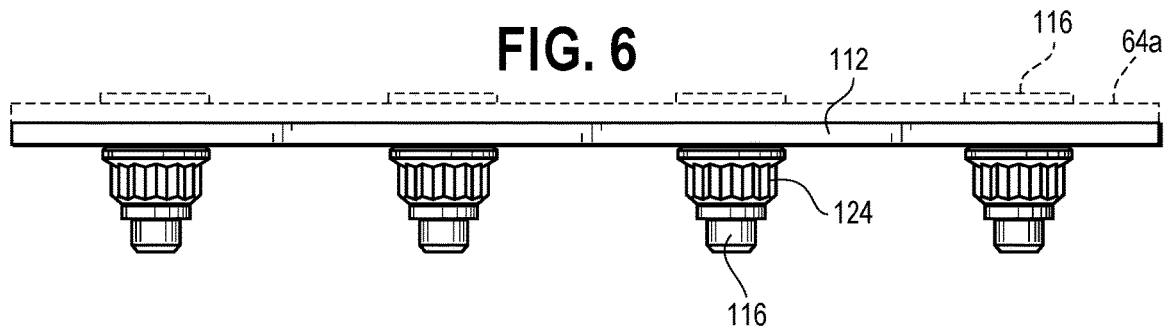
FIG. 6 is an enlarged fragmentary top plan view of the releasable fastening assembly of FIG. 5.
Figure 7:
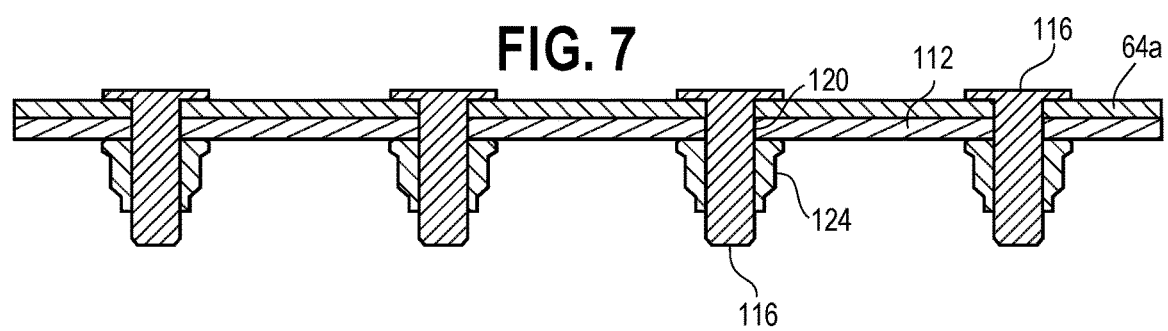
FIG. 7 is an enlarged cross sectional view of the releasable fastening assembly of FIG. 5.

In a first embodiment, the releasable fastening assembly 108 comprises a strap 112 and a plurality of forward-protruding threaded fasteners 116, as shown in FIG. 5. The strap 112 includes four apertures 120 for receiving or accommodating the four threaded fasteners 116. In this embodiment, each acoustic panel member 60a includes two threaded fasteners 116 protruding in a forward direction, as shown in FIG. 5, where the forward direction is coming out of the page. As further shown in FIG. 8, a head side of one of the threaded fasteners 116 is bonded to an inner wall of the front rail 64a. As further shown in FIG. 8, the head side of the threaded fastener 116 has a radial extent sufficient to provide surface area for bonding of the threaded fastener 116 to the front rail 64a to provide anti-rotation. Moreover, the axial extent of the head side of the threaded fastener 116 is limited by the need to provide adequate acoustic area. Two acoustic panel members 60a are positioned adjacent to one another such that four threaded fasteners 116 are protruding in a forward direction, as shown in FIG. 5. As another step, the strap 112 is positioned onto the acoustic panel members 60a such that the threaded fasteners 116 protrude through the apertures 120 of the strap 112, as shown in FIGS. 6 and 7. Optionally, washers may be positioned about the threaded fasteners 116 forward of the strap 112. As another step, four nuts 124 are fastened onto the four threaded fasteners 116 to secure the strap 112 to the threaded fasteners 116, thereby securing one acoustic panel member 60*a* to another acoustic panel member 60*a*. Optionally, there may be two threaded fasteners 116 instead of four and the strap 112 may be shorter because it needs to facilitate only two threaded fasteners, not four.

The first acoustic panel member 60*a* and the second acoustic panel member 60*a* each comprise a front structural member in the form of a forward rail 64 and an aft structural member in the form of an aft rail 68*a*, as shown in FIG. 8. The strap 112 is disposed adjacent the forward rail 64*a* of each acoustic panel member 60*a*, as shown in FIG. 8. In this way, the releasable fastening assembly 108 secures a forward rail 64*a* of one acoustic panel member 60*a* to a forward rail 64*a* of an adjacent acoustic panel member 60*a*, as shown in FIG. 5. Releasable fastening assemblies 108 disposed forward of the forward rail 64*a* are conveniently accessible for when an assembly 108 needs to be released or unlocked or reinstalled. In this manner, four releasable fastening assemblies 108 secure the four acoustic panel members 60*a* to one another to form a ring of the front acoustic panel 56*a*, as shown in FIG. 4A. The releasable fastening assembly 108 shown in FIGS. 5-8 can be released by removing the nuts 124, optionally removing any washers, and removing the strap 112 from the threaded fasteners 116. This results in unsecurement of adjacent acoustic panel members 60*a* from one another. Steps described with respect to the releasable fastening assembly 108 of FIGS. 5-8 and with respect to other releasable fastening assemblies 108 (described below) can be used during installation, during replacement of an acoustic panel member 60*a* with a new acoustic panel member 60*a* or during repair of the acoustic panel member 60*a* when the repaired acoustic panel member 60 needs to be removed from or re-installed in the aircraft engine 20*a*.

For instance, a method of arranging (in other words, installing, repairing, replacing, etc.) an acoustic panel 56*a* of a gas turbine engine 20*a* may include the step of releasing a fastening assembly 108 that secures a first acoustic panel member 60*a* to a second acoustic panel member 60*a*. For example, two releasable fastening assemblies 108 disposed proximal two circumferential ends of an acoustic panel member 60*a* (as shown in FIG. 4A) may be released. The step of releasing a fastening assembly 108 may be performed as described in connection with any one of the four embodiments of the releasable fastening assemblies 108. The method of arranging may further include removing the first acoustic panel member 60*a* from the gas turbine engine 20*a*. For example, the acoustic panel member 60*a* of FIG. 4A that has been freed by the release of the fastening assemblies 108 may be removed from the gas turbine engine 20*a* shown in FIG. 4. The method of arranging may further include installing a replacement acoustic panel member to the gas turbine engine 20*a* (the replacement acoustic panel member 60*a* can be the first acoustic panel member 60*a* of FIG. 4A that was removed and that has been repaired or the replacement acoustic panel member 60*a* can be a new acoustic panel member 60*a* substantially identical to the first acoustic panel member 60*a* of FIG. 4A). The method of arranging may further include securing the fastening assembly 108 in a manner that secures the replacement acoustic panel member 60*a* to the second acoustic panel member 60*a*. For example, two fastening assemblies 108 may be secured to two circumferential ends of the replacement acoustic panel member 60*a*, as shown in FIG. 4A. Likewise, the step of securing the fastening assembly 108 may be performed as described in connection with any one of the four embodiments of the releasable fastening assemblies 108.

Figure 9:
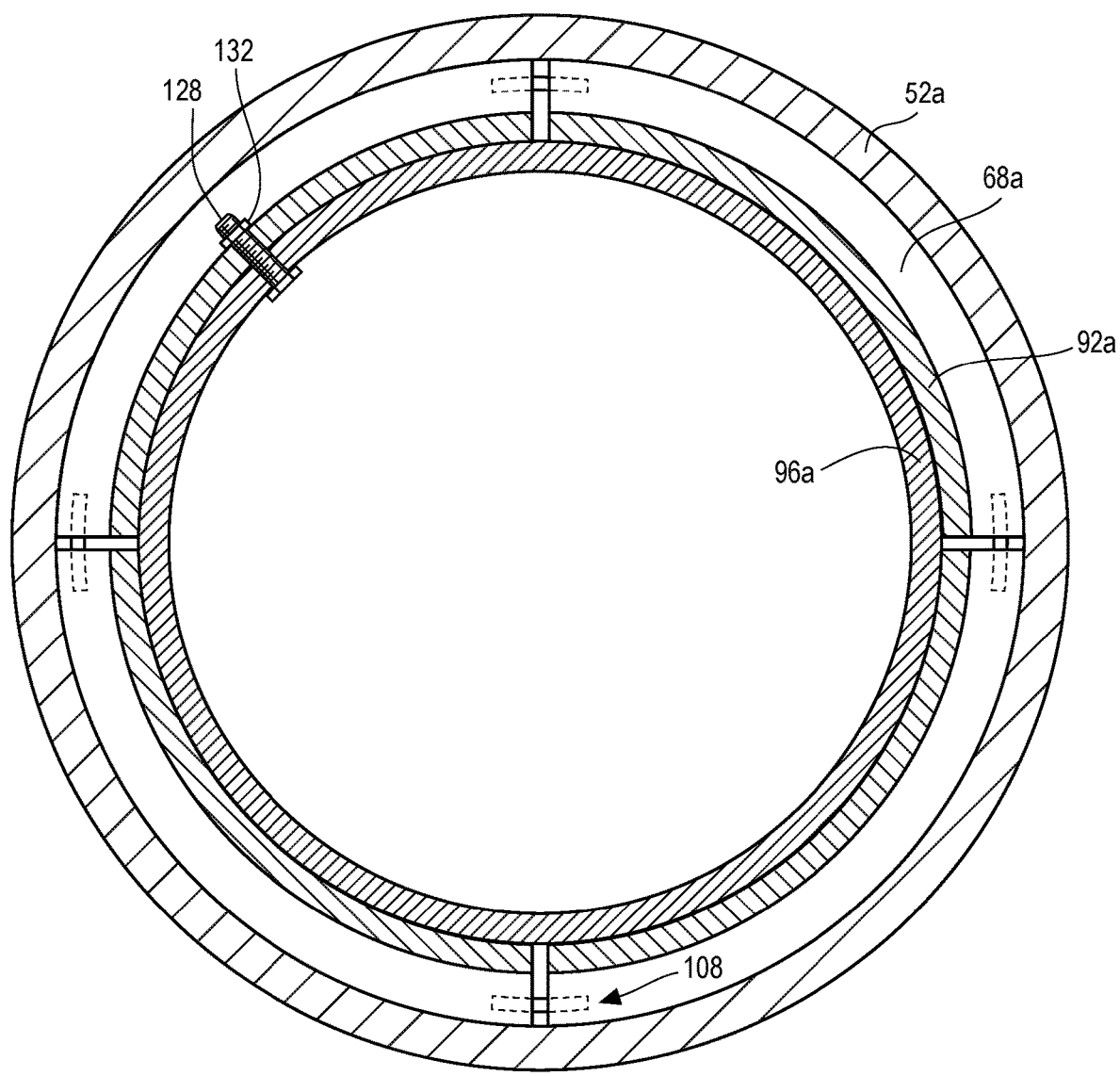
FIG. 9 is a schematic rear cross-sectional view of the acoustic panel and the fan casing, showing one member of the acoustic panel secured to the fan casing by an aft fastener.
Figure 10:
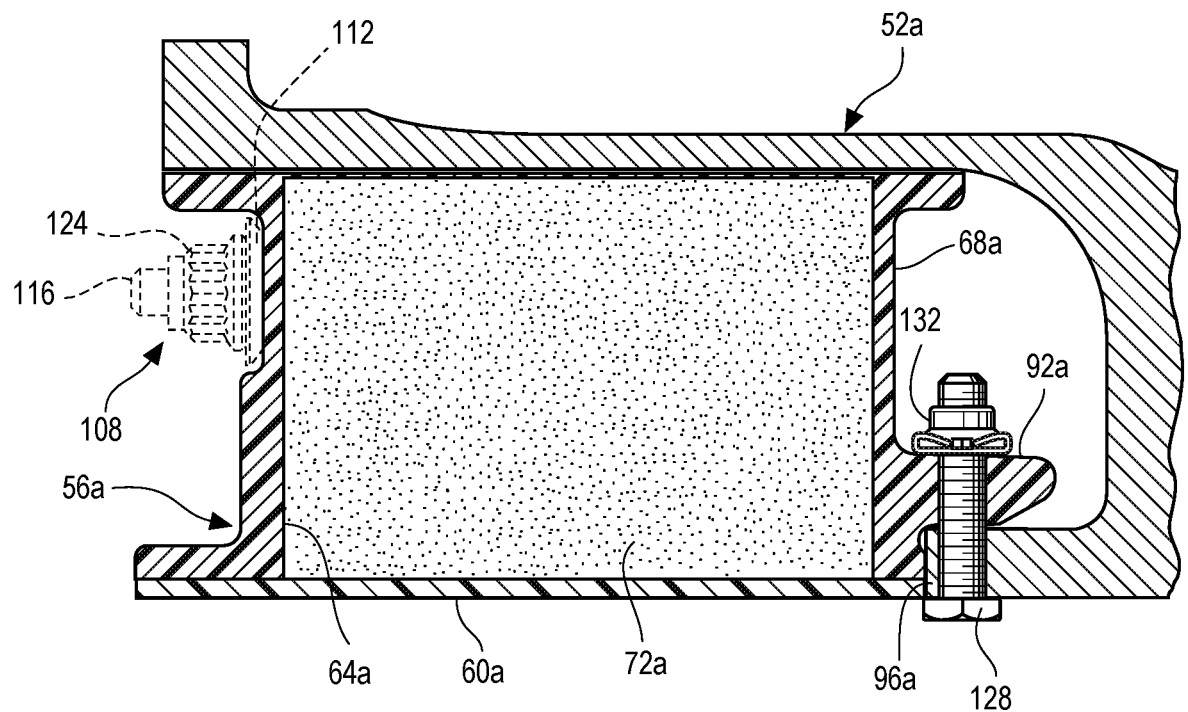
FIG. 10 is a cross-sectional view of the acoustic panel, showing the one member of the acoustic panel secured to the fan casing by the aft fastener.

One advantage of the front acoustic panel 56*a* having a releasable fastening assembly is that circumferential securement to the fan casing 52*a* can be provided by a single aft fastener 128, as shown in FIG. 9. As shown in FIG. 10, an aft fastener 128 secures an aft rail 68*a* of an acoustic panel member 60*a* with the protrusion 96*a* of the fan casing 52*a*. As further shown in FIG. 10, a nutplate 132 is secured to a position above an aft protrusion 92*a* of the aft rail 68*a*. As further shown in FIG. 10, the aft fastener 128 in the form of a threaded fastener is positioned from below the protrusion 96*a* of the fan casing 52*a* into an aperture in the protrusion 96*a*. Moreover, the aft fastener 128 extends into an aperture in the aft protrusion 92*a* of the aft rail 68*a* of the acoustic panel member 60*a*, as shown in FIG. 10. The aft fastener 128 is secured to the nutplate 132, thereby securing the aft rail 68*a* of the acoustic panel member 60*a* to the fan casing 52*a*. This provides circumferential securement of one acoustic panel member 60*a* with respect to the fan casing 52*a*. And because the one acoustic panel member 60*a* is secured to the other three acoustic panel members 60*a* to form a ring of the front acoustic panel 56*a*, the aft fastener 128 also provides circumferential securement of the entire front acoustic panel 56*a* to the fan casing 52*a*, as shown in FIG. 9. The aft fastener 128 also provides axial securement of the entire front acoustic panel 56*a* because the acoustic panel member 60*a* secured to the aft fastener 128 cannot move very substantially in the direction of the axis 48 of the aircraft engine 20, which can be seen in FIG. 1.

One advantage of using the aft fastener 128 instead of the O-ring 104 of the prior art shown in FIG. 2 is that the aft fastener 128 provides improved circumferential securement. This securement helps in avoiding damaging frettage that can occur when the front acoustic panel rubs the fan casing due to loose circumferential securement. In addition, the improved circumferential securement helps prevent the phenomenon of sealant falling down between the front acoustic panel and the fan casing.

In some embodiments, each acoustic panel member 60*a* may be independently secured to the fan casing 52*a* by a corresponding aft fastener 128, resulting in a total of four aft fasteners 128 providing circumferential and axial securement. Such additional securement ensures that the circumferential and axial securement is fail-safe in case an aft fastener 128 fails. In still other embodiments, multiple aft fasteners 128 may be used for each acoustic panel member 60*a*, resulting in a total of 8, 12, 16 or more aft fasteners 128 providing circumferential and axial securement of the front acoustic panel 56*a*. The aft fastener 128 can be used in combination with any releasable fastening assembly 108 and the aft fastener 128 can be fastened to any fan casing 52*a* that surrounds the fan 28*a* to prevent circumferential movement of the acoustic panel 56*a*.

This patent application incorporates by reference co-pending U.S. patent application Ser. No. 15/452,341, entitled "Acoustic Panel of Turbine Engine" by Robert Heeter et al., filed Mar. 7, 2017, owned by the assignee of the present application. The aft fastener 128 used can be any type of securement mechanism 128 disclosed in said co-pending U.S. patent application Ser. No. 15/452,341, entitled "Acoustic Panel of Turbine Engine" by Robert Heeter et al., filed Mar. 7, 2017, owned by the assignee of the present application. The aft fastener 128 can be securement mechanisms 128, 128*b*, 128*c*, 128*d*, 128*e*, or any other suitable securement mechanism disclosed in said co-pending U.S. patent application Ser. No. 15/452,341, entitled "Acoustic Panel of Turbine Engine" by Robert Heeter et al., filed Mar. 7, 2017, owned by the assignee of the present application.

Figure 11:
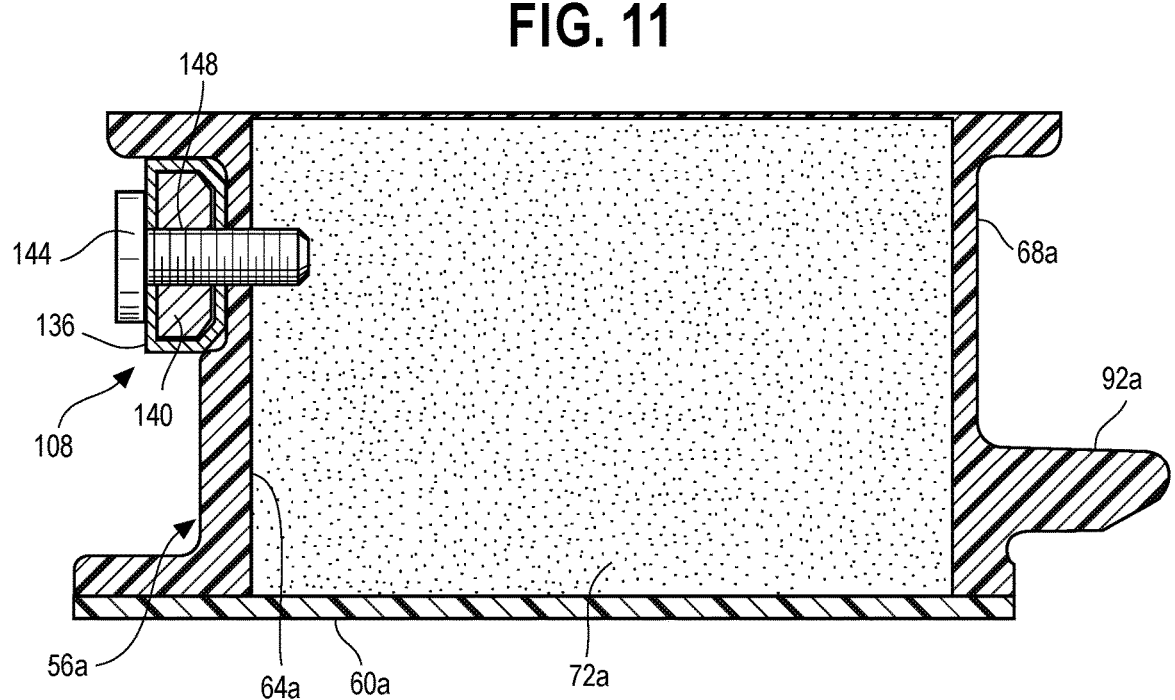
FIG. 11 is a cross-sectional view of the acoustic panel showing a second embodiment of the releasable fastening assembly.
Figure 12:
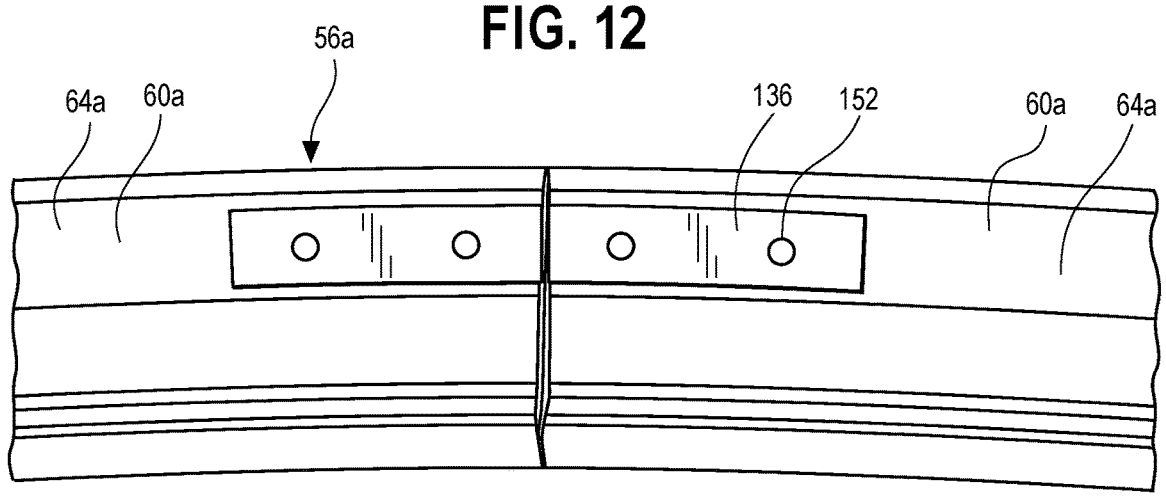
FIG. 12 is a front elevational view of a part of the acoustic panel along with pockets of the second embodiment of the releasable fastening assembly.
Figure 13:
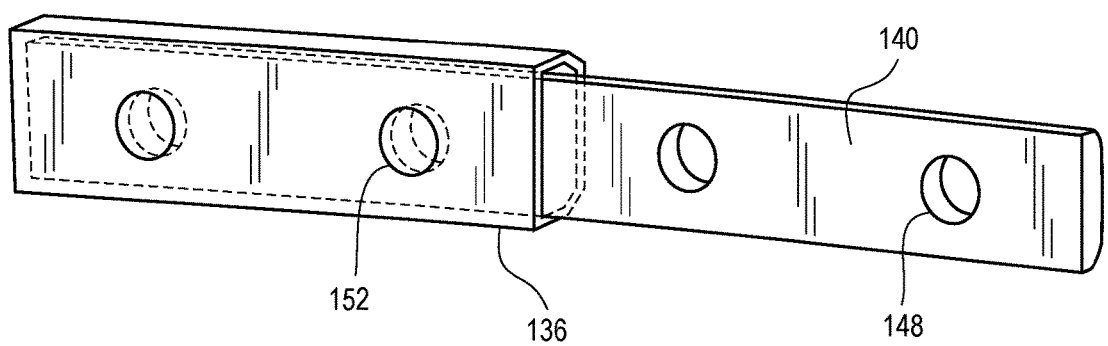
FIG. 13 is an isometric view of a strap of the second embodiment of the releasable fastening assembly, with the pockets of the second embodiment enclosing the strap.
Figure 14:
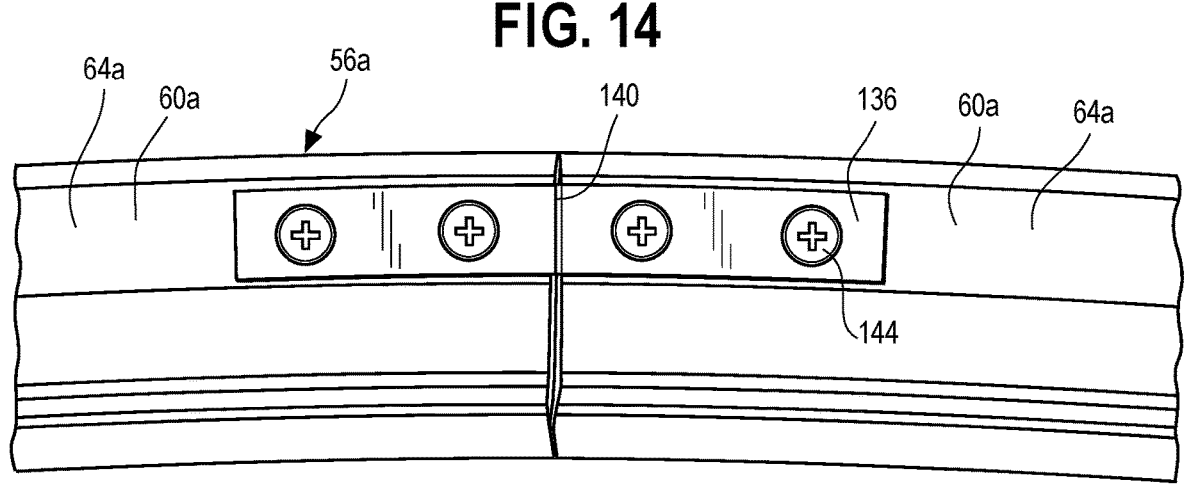
FIG. 14 is a front elevational view of a part of the acoustic panel with the second embodiment of the releasable fastening assembly in a fastened state.

A second embodiment of the releasable fastening assembly 108 is shown in FIG. 11 and includes pockets 136, a strap 140 disposed within the pockets 136 (as shown in FIG. 13), and threaded fasteners 144 extending through the pockets 136 and through the strap 140 and into the forward rail 64a of an acoustic panel member 60a. As shown in FIG. 11, the threaded fastener 144 is positioned into the forward rail 64a from a forward side of the acoustic panel member 60a. As shown in FIG. 12, adjacent acoustic panel members 60a are attached to pockets 136, with one pocket 140 being attached to each acoustic panel member 60a. When the acoustic panel members 60a are positioned adjacent one another, the pockets 136 are aligned with one another, as shown in FIG. 12. The strap 140 is inserted into the pockets 136 from one side until four threaded apertures 148 of the strap 140 align with four apertures 152 of the two pockets 136. The four threaded apertures of the strap 140 are configured to receive the four threaded fasteners 144. Optionally, the four apertures 152 are threaded. As another step, four threaded fasteners 144 are inserted into the four threaded apertures 148 and into the four apertures 152 to secure the strap 140 to the pockets 136, thereby securing the adjacent acoustic panel members 60a to one another. The releasable fastening assembly 108 is shown in a fastened state in FIG. 14.

It should be noted that the strap 140 is disposed adjacent a forward rail 64a of each acoustic panel member 60a, as shown in FIG. 11. In this way, the releasable fastening assembly 108 secures a forward rail 64a of one acoustic panel member 60a to a forward rail 64a of another acoustic panel member 60a. In like manner, four releasable fastening assemblies 108 secure the four acoustic panel members 60a to one another to form a ring of the front acoustic panel 56a. To release or unlock the releasable fastening assembly 108 of FIG. 11, the four threaded fasteners 144 are removed from the strap 140, which is then removed from the pockets 136. In this way, the adjacent acoustic panel members 60a can be secured and unsecured from one another during assembly, repair, or replacement.

Figure 18:
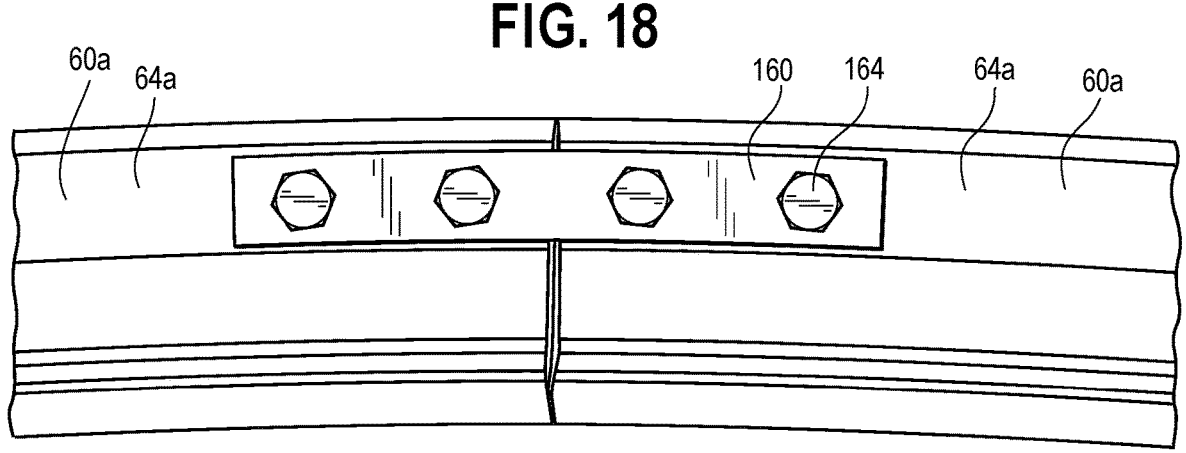
FIG. 18 is a front elevational view of a part of the acoustic panel with the third embodiment of the releasable fastening assembly in a fastened state.

A third embodiment of the releasable fastening assembly 108 is shown in FIG. 16 and includes a pair of two-nutplate channels 156, an L-shaped strap 160 that is sufficiently wide to align with the combination of the pair of two-nutplate channels 156, and four threaded fasteners 164 for mating with the two-nutplate channels 156. An example of a two-nutplate channel 156 is shown in FIG. 15. As shown in FIG. 17, two adjacent acoustic panel members 60a are positioned adjacent to one another. As further shown in FIG. 17, the forward rails 64a of adjacent acoustic panel members 60a are attached to two-nutplate channels 156, with one two-nutplate channel 156 attached to each forward rail 64a. Another step includes positioning the L-shaped strap forward of the pair of two-nutplate channels 156 and adjacent thereto, as shown in FIG. 16. At this stage, four apertures of the L-shaped strap 160 are aligned with the four nuts of the pair of two-nutplate channels 156. Another step includes inserting four threaded fasteners 164 through the four apertures of the L-shaped strap 160 and securing the four threaded fasteners 164 to the four nuts of the pair of two-nutplate channels 156, thereby securing the L-shaped strap 160 to the pair of two-nutplate channels 156, as shown in FIG. 18. This, in turn, results in the securement of the two adjacent acoustic panel members 60a to one another.

It should be noted that the nutplate channels 156 are disposed adjacent a forward rail 64a of each acoustic panel member 60a, as shown in FIG. 16. In this way, the releasable fastening assembly 108 secures a forward rail 64a of one acoustic panel member 60a to a forward rail 64a of another acoustic panel member 60a. In like manner, four releasable fastening assemblies 108 secure the four acoustic panel members 60a to one another to form a ring of the front acoustic panel 56a. The release or unlocking of the releasable fastening assembly 108 of FIG. 18 occurs by loosening and removing the four threaded fasteners 164 and removing the L-shaped strap. In this way, the adjacent acoustic panel members 60a can be secured and unsecured from one another for assembly, repair, or replacement.

Referring now to FIG. 19, a fourth embodiment of the releasable fastening assembly 108 includes a 90-degree bent bracket 168 that includes a through-hole 172, a 90-degree bent bracket 176 that includes a nutplate 180, a threaded fastener 184 such as a bolt, and a cylindrical spacer 188. As one step, two acoustic panel members 60a are positioned adjacent to one another. The bent bracket 168 (an example of an attachment member) having a hole 172 is attached to one acoustic panel member 60a and the bent bracket 176 (an example of an attachment member) having a nutplate 180 is attached to the other acoustic panel member 60a. The cylindrical spacer or collar 188 is positioned between the bent bracket 168 and the bent bracket 172. As another step, the threaded fastener 184 is inserted through the hole 172 of the bent bracket 168 into the cylindrical spacer 188 and further into securement with the nutplate 180. In this way, the threaded fastener 184 secures bent bracket 168 to bent bracket 176, thereby securing one acoustic panel member 60a to the adjacent acoustic panel member 60a.

Moreover, the threaded fastener 184 is disposed adjacent a forward rail 64a of each acoustic panel member 60a, as shown in FIG. 19. In this way, the releasable fastening assembly 108 secures a forward rail 64a of one acoustic panel member 60a to a forward rail 64a of another acoustic panel member 60a. In like manner, four releasable fastening assemblies 108 secure the four acoustic panel members 60a to one another to form a ring of the front acoustic panel 56a. The release or unlocking of the releasable fastening assembly 108 of FIG. 19 occurs by loosening and removing the threaded fastener 184 and removing the cylindrical spacer 188. In this way, the adjacent acoustic panel members 60a can be secured and unsecured from one another for assembly, repair, or replacement.

It should be noted that the threaded fastener 184 of FIG. 19 is disposed substantially parallel to the circumferential direction of the front acoustic panel 56a such that tightening the threaded fastener increases circumferential loading of one acoustic panel member 60a against an adjacent acoustic panel member 60a to which it is secured by the threaded fastener 184. A crow's foot tool may be used to fasten the threaded fastener 184. When the threaded fastener 184 is loosened, the adjacent acoustic panel members 60a move apart from one another, as shown in FIG. 20. When the threaded fastener 184 is tightened, the adjacent acoustic panel members 60a move closer together, as shown in FIG. 19.

One reason to loosen the threaded fastener 184 is to allow the ring of the front acoustic panel 56a to grow in diameter, thereby coming into contact with the inner diameter of the fan casing 52a, thereby inducing an interference fit between the panel 56a and the casing 52a. FIG. 4A best shows how moving the acoustic panel members 60a apart from one another by loosening the threaded fastener 184 can result in the front acoustic panel 56a coming into contact with the inner surface of the fan casing 52a. Such an interference fit of the front acoustic panel 56a provides circumferential securement such that the aft fastener 128 (described above in connection with FIG. 10) is not necessary for circumferential securement. Alternatively, the aft fastener 128 can be used in addition to the interference fit induced by the threaded fastener 184.

Moreover, it should be noted that other suitable embodiments of the releasable fastening assembly 108 may exist. It should also be noted that the four embodiments of the releasable fastening assembly 108 are disposed on a forward surface of the acoustic panel members 56a, as shown in FIG. 5, for example.

In some instances, for example in small and medium sized engines, it may be desirable to quickly remove the ring of the front acoustic panel 56a for fast turnaround time for maintenance. In such an instance, the aft fastener 128 seen in FIG. 10 is removed and the ring of the front acoustic panel 56a is removed as a full hoop, with the releasable fastening assemblies 108 still securing the four acoustic panel members 60a to one another.

In addition to the advantages described elsewhere, the front acoustic panel 56a having the releasable fastening assemblies 108 meets the zero-splice requirements for good noise mitigation. In other words, the releasable fastening assemblies 108 do not intrude into honeycomb acoustic material 72a of the front acoustic panel 56a in a way that violates zero-splice requirements. The relatively continuous circumferential coverage provided by the honeycomb acoustic material 72a is maintained by the front acoustic panel 56a having a releasable fastening assembly 108, such as the assembly 108 of FIG. 5, thereby maintaining good noise reduction. The front acoustic panel 56a having one of the releasable fastening assemblies 108 has another advantage in that the manufacturing of the front acoustic panels 56a is simple in comparison with manufacturing a full-hoop front acoustic panel.

One further improvement to the front acoustic panels 56a is to replace polysulphide ribs from an outer diameter of the front acoustic panels 56a with a soft closed-cell foam material instead.

INDUSTRIAL APPLICABILITY

In summary, a four-piece front acoustic panel where the four pieces are secured to one another by four releasable fastening assemblies has numerous advantages. First, such a four-piece acoustic panel can hold itself radially. Additionally, only the acoustic panel member that has been damaged has to be removed for repair or replacement, rather than needing to replace the full hoop. These advantages are magnified when such a front acoustic panel is secured to the fan casing by an aft fastener that extends through a protrusion in an aft rail of an acoustic panel member. This provides improved circumferential and axial securement, thereby reducing any damage from fretting. The front acoustic panel described herein also eliminates the need for O-rings near the aft rail and brackets fastened to the fan casing near the forward rail. Because there is no need for an O-ring, there is also no need for an O-ring recess 100 in the fan casing 52 (the recess 100 can be seen in FIG. 2). Thus, machining time for the fan casing 52 is reduced. The machining time for the fan casing 52 is further reduced because there is no need to machine a horizontal recess that receives fasteners 78 that secure brackets 76 to the fan casing 52. Such brackets 76 are shown in FIG. 2.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure. Numerous modifications to the present disclosure will be apparent to those skilled in the art in view of the foregoing description. It should be understood that the illustrated embodiments are exemplary only, and should not be taken as limiting the scope of the disclosure.

We claim:

1. An aircraft engine, comprising:
   a rotating structure;
   a casing circumferentially surrounding the rotating structure;
   an acoustic panel for noise reduction circumferentially surrounding the rotating structure and disposed adjacent to and enclosed by the casing, the acoustic panel comprising a plurality of acoustic panel members arranged adjacent to one another to form a substantially complete ring of the acoustic panel; and
   a releasable fastening assembly adapted to secure adjacent first and second acoustic panel members of the plurality of acoustic members, wherein the fastening assembly includes a first pocket attached to the first acoustic panel member, a second pocket attached to the second acoustic panel member, and a strap disposed in the first pocket and the second pocket and fastened to the first and second acoustic panel members, and at least two threaded fasteners,
   wherein the strap spans the first and second pockets and includes at least two threaded apertures configured to receive the two threaded fasteners,
   wherein a first of the two threaded fasteners extends into the first pocket and a second of the two threaded fasteners extends into the second pocket, and
   wherein the releasable fastening assembly is adapted to be released without removal of either the first and the second acoustic panel members from the casing, and releasing the fastening assembly unsecures the first and the second acoustic panel members such that the first acoustic panel member is removable from the casing without removing the second acoustic panel member from the casing.

2. The aircraft engine of claim 1, wherein the first acoustic panel member comprises a first front structural member and a first aft structural member, wherein the second acoustic panel member comprises a second front structural member and a second aft structural member, wherein the first front structural member is removably secured to the second front structural member by the releasable fastening assembly.

3. The aircraft engine of claim 2, wherein at least the first aft structural member is fastened to the casing surrounding the rotating structure to prevent circumferential movement of the acoustic panel.

4. The aircraft engine of claim 1, wherein the releasable fastening assembly is disposed on a forward surface of the first and second acoustic members.

5. The aircraft engine of claim 1, wherein the releasable fastening assembly includes at least a first threaded fastener attached to the first acoustic panel member, a second threaded fastener attached to the second acoustic panel member, wherein the strap includes at least a first aperture to accommodate the first threaded fastener and a second aperture to accommodate the second threaded fastener.

6. The aircraft engine of claim 5, wherein the first and second threaded fasteners protrude in a forward direction through the first and second apertures of the strap and wherein the releasable fastening assembly further comprises first and second nuts that secure the strap to the first and second threaded fasteners respectively.

7. The aircraft engine of claim 1, wherein the releasable fastening assembly comprises a threaded fastener disposed substantially parallel to the circumferential direction of the acoustic panel such that tightening the threaded fastener increases the circumferential loading of the first acoustic member against the second acoustic member.

8. The aircraft engine of claim 7, wherein the releasable fastening assembly further comprises a first attachment member attached to the first acoustic panel member and a second attachment member attached to the second acoustic panel member, wherein the threaded fastener secures the first attachment member to the second attachment member.

9. A method of arranging an acoustic panel disposed in a gas turbine engine, the acoustic panel having first and second acoustic panel members, the method comprising:
   releasing a first threaded fastener from a first pocket secured to the first acoustic panel member and a first portion of a strap disposed in the first pocket;
   releasing a second threaded fastener from a second pocket secured to the second acoustic panel and a second portion of the strap disposed in the second pocket;
   removing the strap from the first and second pockets to unsecure the first and second acoustic panel members from one another;
   removing the first acoustic panel member from the gas turbine engine while the second acoustic member is retained in the gas turbine engine;
   installing a replacement acoustic panel member to the gas turbine engine in a space formerly occupied by the first acoustic panel member; and
   inserting into and fastening the strap to a third pocket secured to the replacement acoustic panel and the second pocket to secure the replacement acoustic panel member to the second acoustic panel member.

10. The method of claim 9, wherein the steps of releasing the first and second fasteners and removing the strap are undertaken without removing either the first and the second acoustic panel from the gas turbine engine.

11. The method of claim 9, wherein the step of fastening the strap comprises:
   positioning the strap onto the second acoustic panel member and the replacement acoustic panel member; and
   fastening four nuts onto four threaded fasteners that protrude out of the second and the replacement acoustic panel members.

12. An acoustic panel enclosed within a casing of an aircraft engine, the acoustic panel comprising a plurality of acoustic panel members arranged adjacent to one another to form a substantially complete annulus of the acoustic panel, wherein a first acoustic panel member of the plurality of acoustic panel members is adjacent to a second acoustic panel member of the plurality of acoustic panel members and wherein the first acoustic panel member is removably attached to the second acoustic panel member by a releasable fastening assembly; wherein the releasable fastening assembly is adapted to be released without removing either the first or the second acoustic panel from the casing, releasing the fastening assembly unsecures the first and second acoustic panel members, and allows the second acoustic panel member to be removed from the casing without removing the first acoustic panel member; and wherein the releasable fastening assembly includes a first pocket attached to the first acoustic panel member, a second pocket attached to the second acoustic panel member, a strap disposed in the first pocket and the second pocket such that the strap spans the first and the second pockets, and first and second fasteners that extend into the first and second pockets to secure the strap to first to the first and second acoustic panel members.

13. The acoustic panel of claim 12, wherein the first acoustic panel member comprises a first front structural member and a first aft structural member, wherein the second acoustic panel member comprises a second front structural member and a second aft structural member, wherein the first front structural member is removably secured to the second front structural member by the releasable fastening assembly.

14. The acoustic panel of claim 13, wherein at least the first aft structural member is fastened to a casing surrounding the acoustic panel to prevent circumferential movement of the acoustic panel.

15. The aircraft engine of claim 13, wherein the releasable fastening assembly is disposed on a forward surface of the first and second acoustic members.

* * * * *